United States Patent
Kurupati

(10) Patent No.: US 7,236,499 B2
(45) Date of Patent: Jun. 26, 2007

(54) RESOURCE ARBITRATION IN ACCORDANCE WITH A MASKED REQUEST VECTOR

(75) Inventor: Sreenath Kurupati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 939 days.

(21) Appl. No.: 10/601,501

(22) Filed: Jun. 23, 2003

(65) Prior Publication Data

US 2004/0258086 A1 Dec. 23, 2004

(51) Int. Cl.
*H04J 3/02* (2006.01)
*G06F 13/00* (2006.01)

(52) U.S. Cl. .................................. 370/462; 711/111

(58) Field of Classification Search ................ 370/439, 370/440, 433, 447, 450; 711/111
See application file for complete search history.

(56) References Cited

U.S. PATENT DOCUMENTS

| | | | | |
|---|---|---|---|---|
| 5,568,485 A | * | 10/1996 | Chaisemartin | ............... 370/462 |
| 6,647,449 B1 | * | 11/2003 | Watts | .......................... 710/111 |
| 7,054,330 B1 | * | 5/2006 | Chou et al. | ................. 370/462 |
| 7,062,582 B1 | * | 6/2006 | Chowdhuri | ................. 710/116 |

* cited by examiner

*Primary Examiner*—Doris H. To
*Assistant Examiner*—Kerri M Rose
(74) *Attorney, Agent, or Firm*—Buckley, Maschoff & Talwalkar LLC

(57) ABSTRACT

According to some embodiments, a resource is allocated in accordance with a masked request vector. For example, a masking unit may receive a request vector and provide a masked request vector, wherein each bit in the request vector represents a requestor and indicates if that requestor is requesting a resource. A first priority encoder may receive the masked request vector from the masking unit and output a signal indicating a selected requestor. According to some embodiments, a second priority encoder may receive the un-masked request vector and output a signal indicating an alternate selected requestor.

21 Claims, 7 Drawing Sheets

1

RESOURCE ARBITRATION IN ACCORDANCE WITH A MASKED REQUEST VECTOR

BACKGROUND

A number of requesters may want to use a limited resource. For example, a number of requestors associated with different input ports may receive information packets that need to be processed and transmitted via a single output port. A resource allocation unit may then allocate the resource to one of those requesters.

The resource allocation unit could scan a list of requestors (starting with the first requestor in the list) and simply allocate the resource to the first requester that is currently requesting the resource. This approach, however, may not be fair. If, for example, the first requester in the list constantly requests the resource, the resource will never be allocated to other requesters.

To avoid this, a "round-robin" approach to resource allocation may be used. For example, a resource allocation unit might scan a list of requestors and allocate the resource to the first requestor that is currently requesting the resource. The next time the resource is to be allocated, however, the resource allocation scans the list starting with the next requestor (e.g., if the resource was allocated to the fourth requestor during one cycle, the list would be scanned starting with fifth requestor during the next clock cycle).

A round-robin approach, however, may be difficult to implement. For example, the hardware used to implement the approach might consume a significant amount of silicon area (e.g., variable shift logic may result in a high gate count, especially when there are a large number of requestors). Moreover, it may take a significant amount of time to perform the resource allocation (e.g., it may be difficult to perform the allocation in a single clock cycle).

DETAILED DESCRIPTION

Some embodiments described here are associated with "requesters." As used herein, the term "requestor" can apply to any function unit (e.g., a hardware or software unit) that might need to access a resource. By way of example only, consider an Ethernet switch or router that operates in accordance with the Fast Ethernet Local Area Network (LAN) transmission standard 802.3-2002® published by the Institute of Electrical and Electronics Engineers (IEEE). The switch or router may have a number of input ports (e.g., 27 input ports), and information packets may be received at several of those input ports. In this case, a Media Application Control (MAC) module associated with each input port might act as a requestor that will ask to have an information packet processed by a resource. A packet parser unit may then select the requester to which the resource will be allocated (and thus which information packet will be processed).

Method

Figure 1:
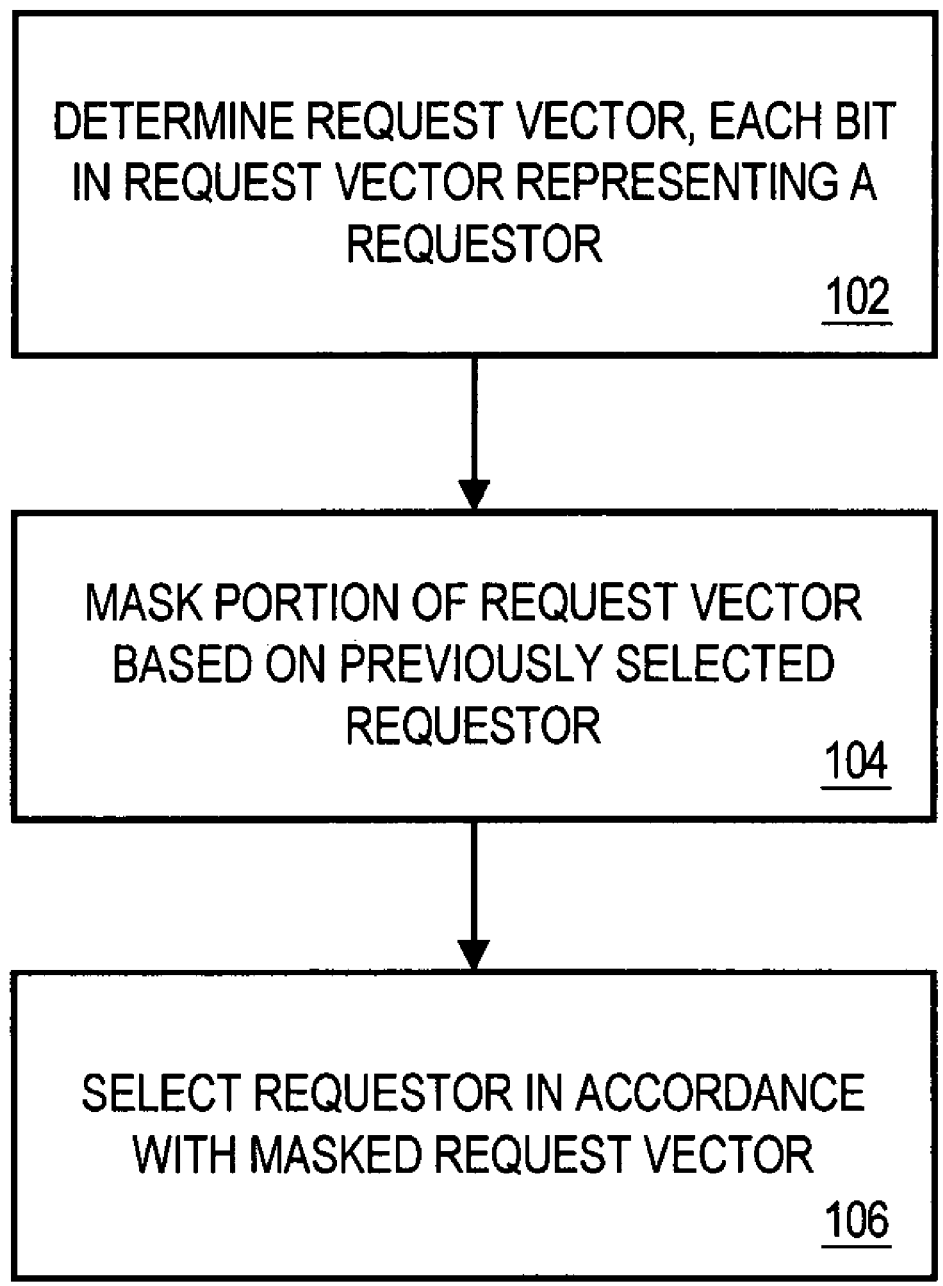
FIG. 1 is a method according to some embodiments.

FIG. 1 is a flow chart of a method according to some embodiments. The flow charts described herein do not necessarily imply a fixed order to the actions, and embodiments may be performed in any order that is practicable. Note that any of the methods described herein may be performed by firmware, hardware, software, or any combination of these techniques. For example, a storage medium may store thereon instructions that when executed by a machine result in performance according to any of the embodiments described herein.

At 102, a request vector is determined, and each bit in the request vector represents a requester. A portion of the request vector is masked at 104 based on a previously selected requester (e.g., the requester to which the resource was allocated during the prior clock cycle). At 106, a requester is selected in accordance with the masked request vector.

Figure 2:
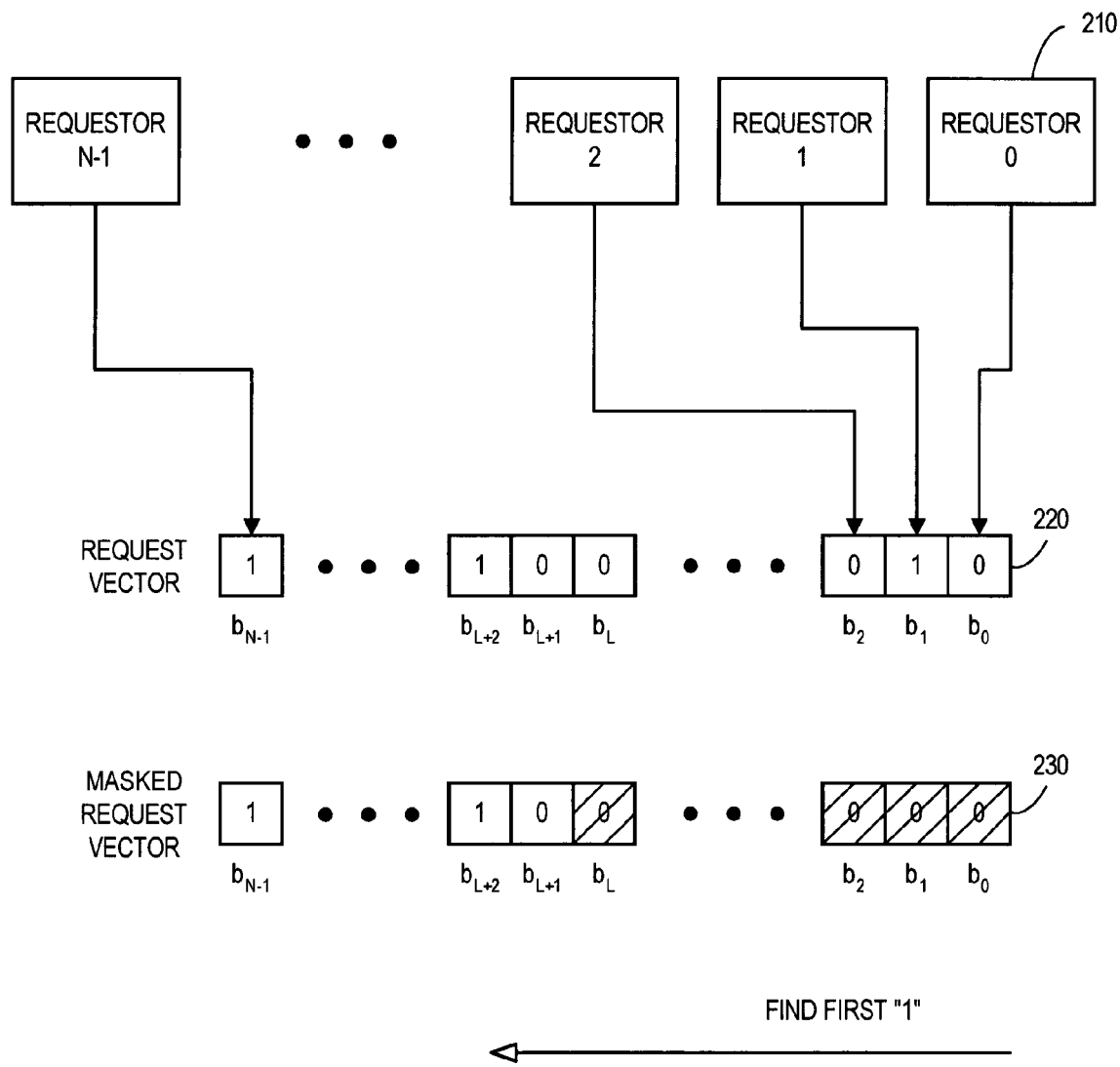
FIG. 2 illustrates a masked request vector according to some embodiments.

Consider, for example, the N requesters 210 illustrated in FIG. 2 along with the associated N bits in the request vector 220 (i.e., bits [$b_{N-1}$, . . . , $b_0$]). In this example, $b_L$ is associated with the last requester that received the resource.

According to this embodiments, a bit with a value of one indicates that the associated requestor is currently requesting a resource, and a value of zero indicates that the requester is not currently requesting the resource (i.e., at least bits $b_{N-1}$, $b_{L+2}$, and $b_1$ are currently requesting the resource in FIG. 2). According to other embodiments, of course, a zero could indicate that a requestor is asking for a resource while a one indicates that it is not.

A masked request vector 230 is created by masking bits $b_L$ through $b_0$ in the request vector 220 (e.g., bits $b_L$ through $b_0$ may be set to zero as illustrated by the shaded bits in FIG. 2).

A requestor 210 is then selected by starting with $b_0$ and looking to find the first bit with a value of one in the masked request vector 230 (e.g., the least significant bit that has a value of one). In this example, $b_{L+2}$ might be selected (note that $b_1$ is not selected because it is masked out in the masked request vector 230). The resource can then be allocated to requestor L+2. The next time the resource is allocated (e.g., during the next clock cycle), bits $b_{L+2}$ through $b_0$ will be masked out in the masked request vector 230 (because at that point, $b_{L+2}$ will be associated with the last requester that received the resource).

Resource Allocation Unit

Figure 3:
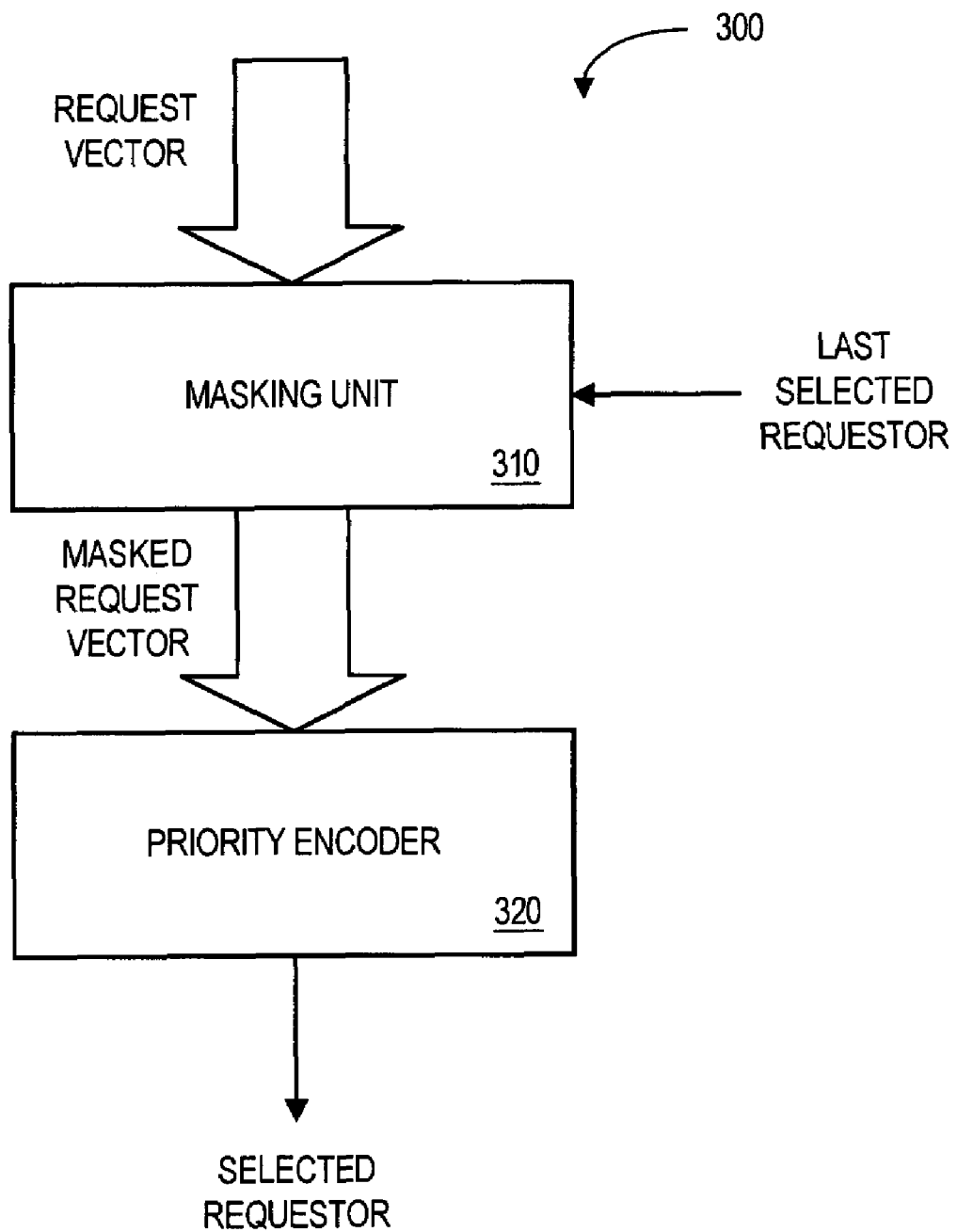
FIG. 3 is a resource allocation unit according to some embodiments.

FIG. 3 is a resource allocation unit 300 according to some embodiments. The resource allocation unit 300 includes a masking unit 310 that receives a request vector (e.g., having bits [$b_{N-1}$, . . . , $b_0$]) along with a signal indicating the last selected requester (e.g., L). The masking unit 310 generates a masked request vector (e.g., by masking bits $b_L$ through $b_0$).

A priority encoder 320 receives the masked request vector from the masking unit 310. The priority encoder 320 outputs a signal indicating a selected requestor (e.g., by finding the least significant bit that has a value of one in the masked request vector). Since the masking unit 310 and the priority encoder 320 are used to select a requester, a round-robin allocation of resources may be efficiently implemented (e.g., in silicon). Moreover, the allocation may be performed more quickly as compared to an implementation that uses variable shift logic.

EXAMPLE

Figure 4:
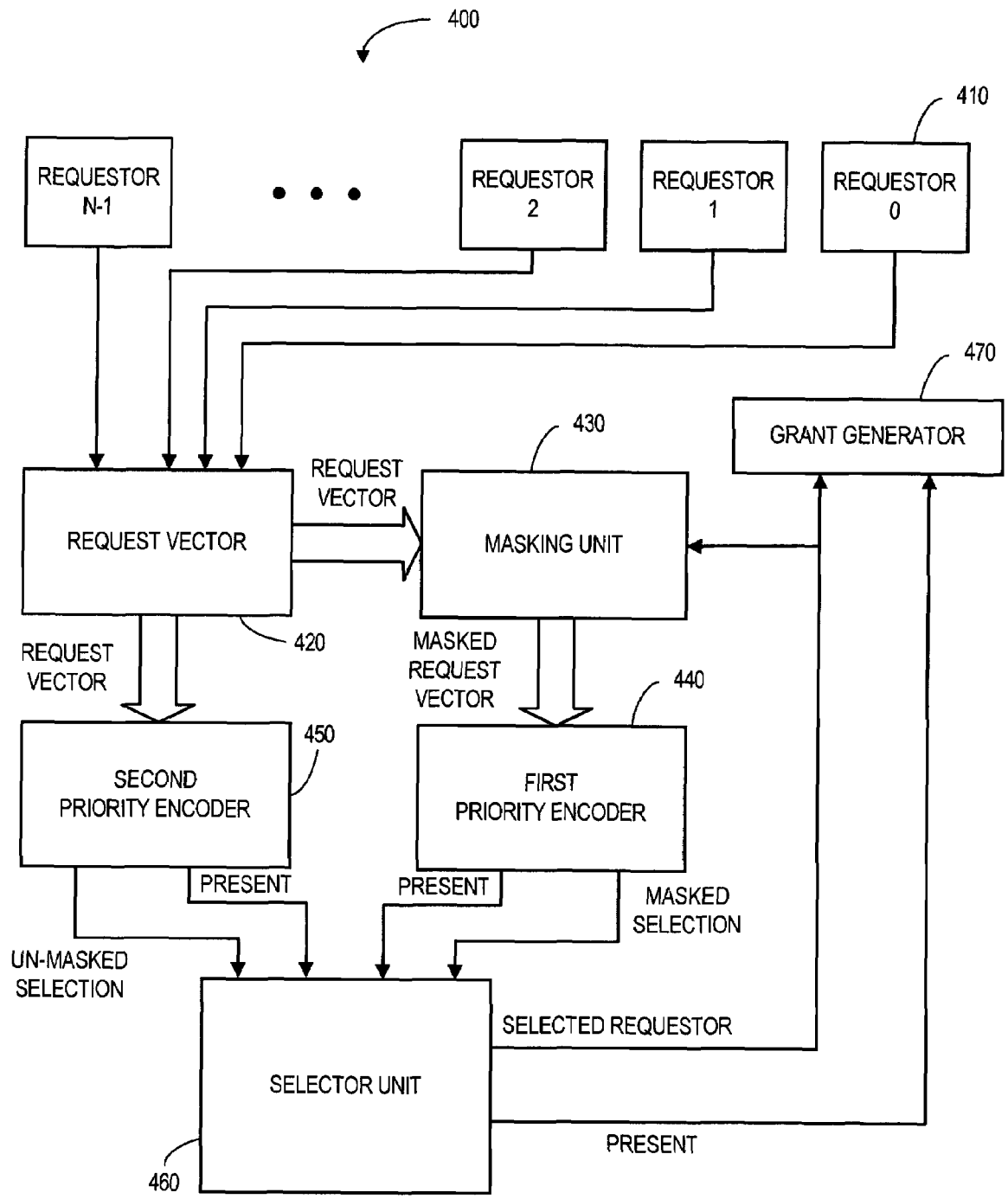
FIG. 4 is an example of a resource allocation system according to some embodiments.

FIG. 4 is an example of a resource allocation system 400 according to some embodiments. As before, each of N requestors 410 provide a request signal (e.g., a one or zero) to establish a request vector 420 having bits $[b_{N-1}, \ldots, b_0]$. This request vector 420 is provided to a masking unit 430.

The masking unit 430 also receives an indication of the previously selected requestor (L). The masking unit 430 may then generate an N-bit mask vector having bits $[m_{N-1}, \ldots, m_0]$, where $m_i$ is set to one if $i > L$ and to zero if $i \leq L$.

The masking unit 430 may generate a masked request vector by combining the request vector with the mask vector via a Boolean AND operation. In the masked request vector, therefore, bits $b_{N-1}$ through $b_{L+1}$ will be the same as they were in the request vector, and bits $b_L$ through $b_0$ will be set to zero.

The masked request vector is provided from the masking unit 430 to a first priority encoder 440. The first priority encoder 440 may then generate a masked selection signal (having log(N) bits) reflecting the least significant bit in the masked request vector that indicates the requestor is requesting a resource. If an eight-bit masked request vector was [0, 1, 0, 0, 1, 0, 0, 0], for example, then the masked selection signal would be [0, 1, 1] representing "three" (because bit $b_3$ was the least significant bit that had a value of one).

As another example, consider a system with six requestors. Moreover, assume that the resource was allocated to the fifth requestor during the last clock cycle and that the current request vector is [0, 0, 1, 0, 1, 0]. In this case, the masked request vector will be [0, 0, 0, 0, 0, 0]—and the first priority encoder 400 will not find any bit in the masked request vector that indicates the requestor is requesting a resource. Not selecting any requestor in this situation, however, would be inefficient because two requestors actually want to use the resource (i.e., the second and fourth requestors).

To avoid this result, a second priority encoder 450 may receive the original (un-masked) request vector 420 and generate an un-masked selection signal (again having log(N) bits) representing the least significant bit in request vector 420 that indicates a requester is requesting a resource. Note that the first and second priority encoders 440, 450 may operate in parallel.

A selector unit 460 may receive the masked selection from the first priority encoder 440 and the un-masked selection from the second priority encoder 450. In addition, according to some embodiments, the selector unit 460 receives a present signal (e.g., a one or a zero) from each of the first and second priority encoders 440, 450 indicating whether or not least one of the bits in the respective vectors had a value of one.

The selector unit 460 then generates a selected requestor signal as follows. If the present signal from the first priority encoder 440 has a value of one (indicating that at least one bit in the masked request vector had a value of one), then the selected requestor signal is the masked selection signal received from the first priority encoder 440. If present signal from the first priority encoder is zero (indicating that all of the bits in the masked request vector were zero), then the selected requestor signal is the un-masked selection signal received from the second priority encoder 450.

The selected requestor may be provided to the masking unit 430 (so that the masking unit 430 will know which bits should be masked during the next clock cycle) and to a grant generator 470. According to some embodiments, the grant generator 470 is a decoder that generates an N-bit grant vector, with each bit being provided to the appropriate requestor 410 (e.g., a single bit in the grant vector may have a value of one to indicate that requestor that will be given access to the resource).

The resource allocation portion of the system 400 (e.g., elements other than the requestors 410) may have a gate count of approximately two when implemented in silicon. Moreover, the timing delay may be similar to a single priority encoder because the two priority encoders are implemented in parallel.

The resource allocation system 400 may be associated with, for example, a packet network, a LAN, an Ethernet network, a switch, and/or a router. Moreover, elements of the system may be implemented as an Application Specific Integrated Circuit (ASIC) device, a Field-Programmable Gate Array (FPGA) device, and/or a custom integrated circuit.

Figure 5:
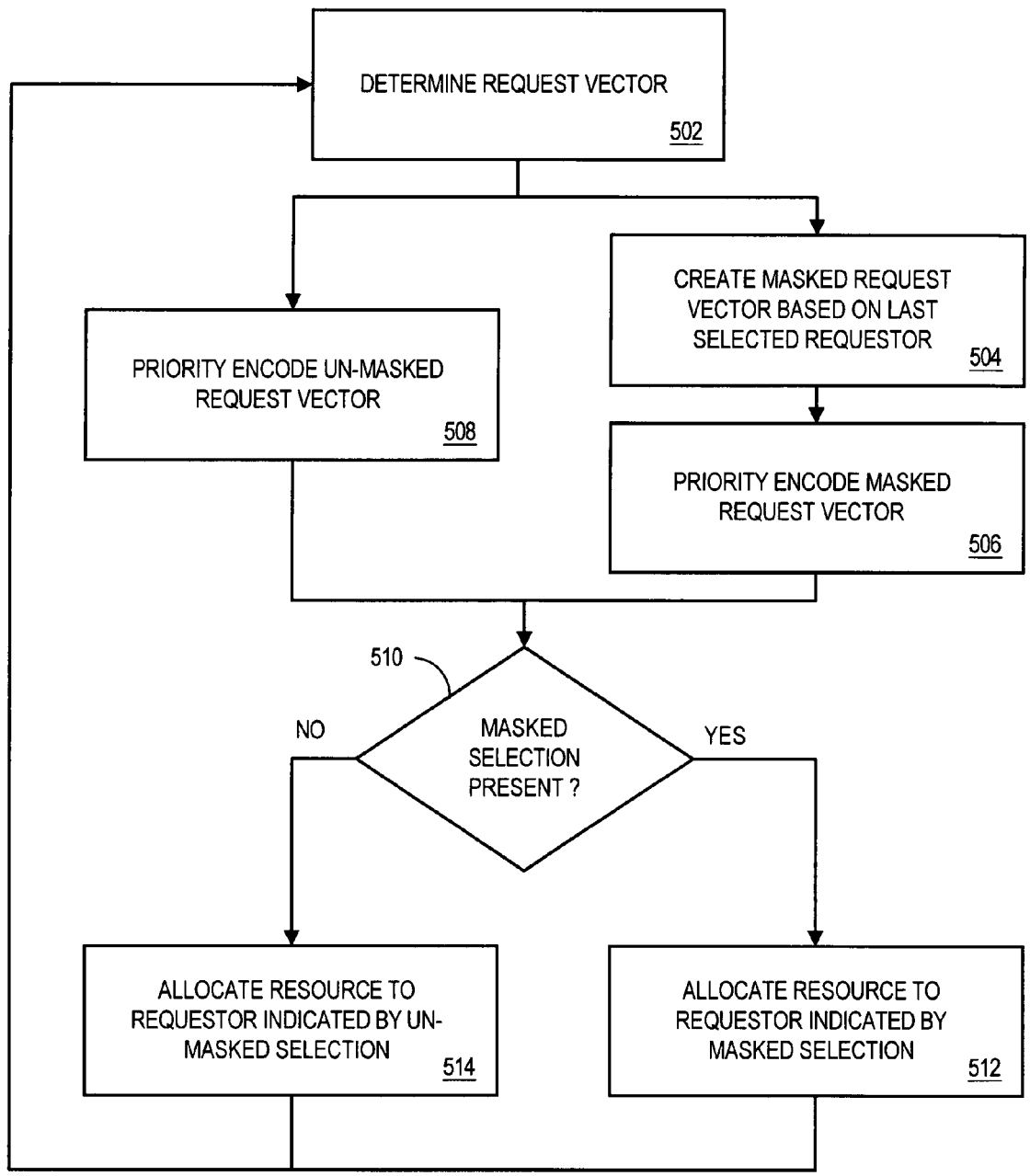
FIG. 5 is a resource allocation method according to some embodiments.

FIG. 5 is a resource allocation method according to some embodiments. The method may be performed, for example, in accordance with the resource allocation system 400 of FIG. 4. At 502, a request vector is determined (e.g., based on information received from a number of different requesters).

A masked request vector is then created at 504 based on the request vector and the last selected requester. A priority encoder receives and processes the masked request vector at 506. While the masked request vector is created and/or processed, another priority encoder process the un-masked request vector at 508.

If there is masked selection present at 510 (e.g., at least one bit in the masked request vector has a value of one), the resource is allocated to a requestor based on the masked selection at 512. If there is no masked selection present at 510 (e.g., all bits in the masked request vector have a value of zero), the resource is allocated to a requestor based on the un-masked selection at 514. The process then continues at 502.

Switch

Figure 6:
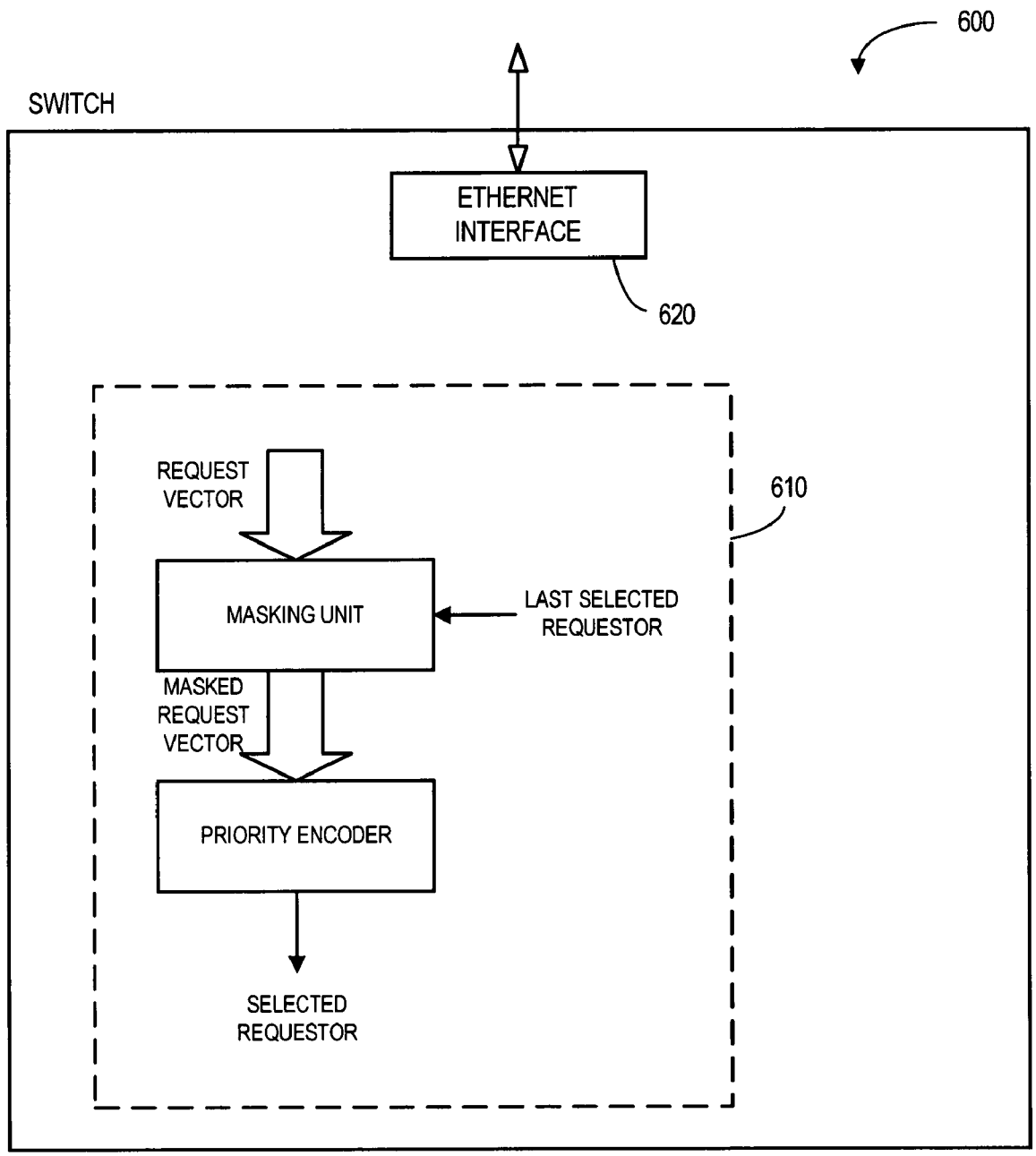
FIG. 6 is a switch according to some embodiments.

FIG. 6 is a switch 600 according to some embodiments. The switch 600 may be, for example, a 24+2 Gigabit Ethernet device. The switch 600 includes a resource allocation unit 610 that operates in accordance with any of the embodiments described herein. The switch 600 also includes an Ethernet interface 620 that may facilitate an exchange of information via a network. According to other embodiments, the switch 600 includes an Asynchronous Transfer Mode (ATM) interface instead of, or in addition to, the Ethernet interface 620.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

In some of the embodiments described herein, a resource allocation unit provides an output that indicates a selected requestor. In other embodiments, however, different information associated with a selected requestor could be provided. For example, a resource allocation unit might output an information packet associated with a selected requestor.

In addition, some embodiments are directed to networks (e.g., packet networks, LANs and/or Ethernet networks) and network devices (e.g., switches and/or routers). Note, however, that embodiments may also be directed to other types of resource allocation and/or arbitration (e.g., outside of the network context).

Similarly, in some embodiments a resource allocation unit selects a single requestor. According to other embodiments, the unit can instead select two or more requestors (e.g., a resource might be able to handle two requestors at the same time).

Figure 7:
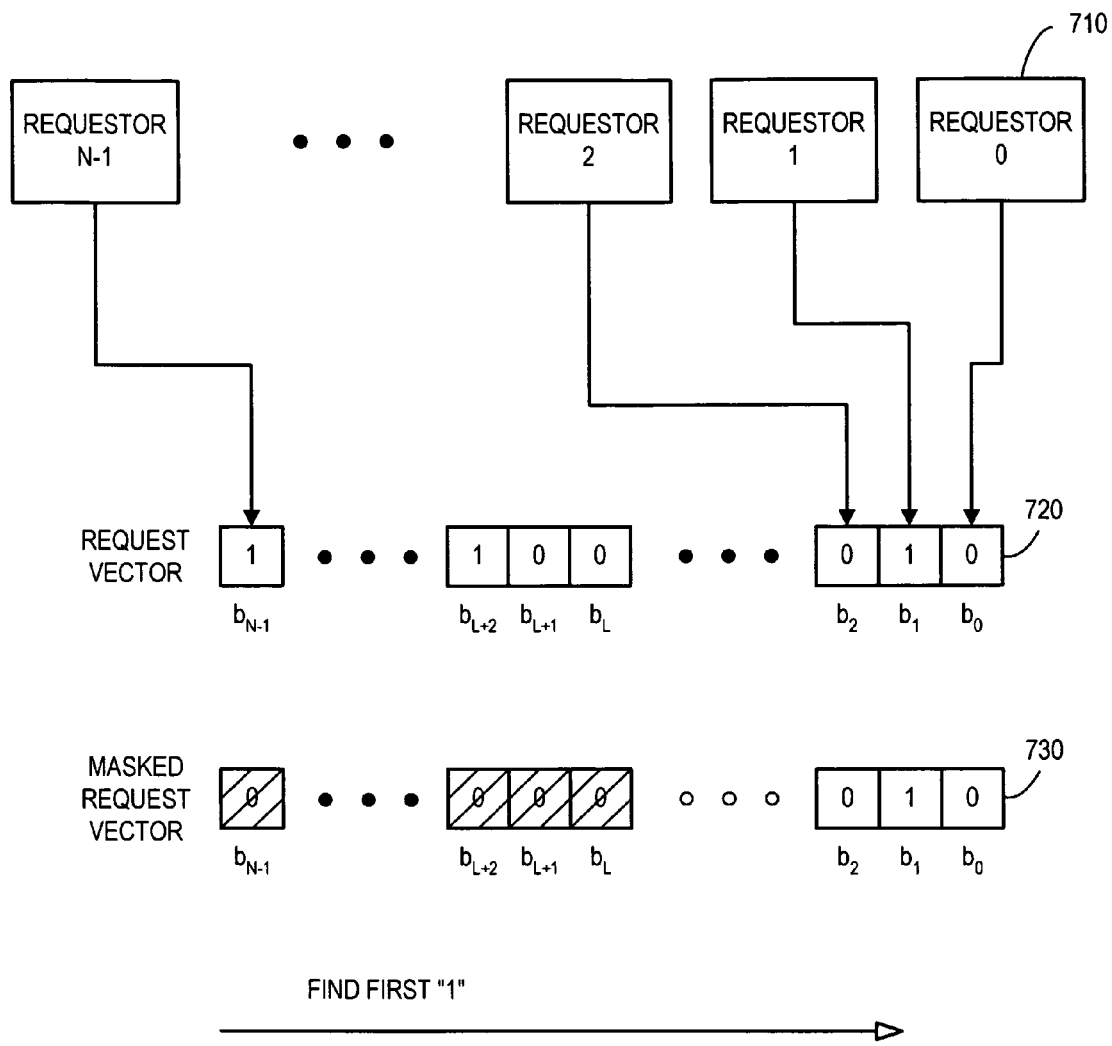
FIG. 7 illustrates a masked request vector according to another embodiment.

Although specific approaches have been described herein, any number of other approaches may be implemented. Consider, for example, FIG. 7 which illustrates a masked request vector according to another embodiment. As before, N requestors 710 are associated with N bits in a request vector 720 (i.e., bits $[b_{N-1}, \ldots, b_0]$), and $b_L$ is associated with the last requestor that received a resource. According to this approach, a masked request vector 730 is created by masking bits $b_{N-1}$ through $b_L$ in the request vector 720. A requestor 710 is then selected by finding the most significant bit (as opposed to the least significant bit) that has a value of one in the masked request vector 730. In this example, $b_1$ might be selected (note that $b_{N-1}$ is not selected because it is masked out in the masked request vector 730). The resource can then be allocated to requestor 1.

The several embodiments described herein are solely for the purpose of illustration. Persons skilled in the art will recognize that other embodiments may be practiced with modifications and alterations limited only by the claims.

What is claimed is:

1. An apparatus, comprising:
    a masking unit to receive a request vector and to provide a masked request vector, wherein each bit in the request vector represents a requestor and indicates if that requestor is requesting a resource;
    a first priority encoder to receive the masked request vector from the masking unit and to output a signal indicating a selected requestor; and
    a second priority encoder to receive the un-masked request vector and to output a signal indicating an alternate selected requestor.

2. The apparatus of claim 1, wherein the request vector is an N-bit request vector having bits $[b_{N-1}, \ldots, b_0]$, the masking unit is to mask bits $b_L$ through $b_0$, $b_L$ representing the previously selected requestor, and the signal output by the first priority encoder represents the least significant bit in the masked request vector that indicates the requestor is requesting a resource.

3. The apparatus of claim 1, wherein the request vector is an N-bit request vector having bits $[b_{N-1}, \ldots, b_0]$, the masking unit is to mask bits $b_{N-i}$ through $b_L$, $b_L$ representing the previously selected requestor, and the signal output by the first priority encoder represents the most significant bit in the masked request vector that indicates the requestor is requesting a resource.

4. The apparatus of claim 1, further comprising:
    a selector unit to receive the signals from the first and second priority encoders and to output a signal based on:
    the signal from the first priority encoder if at least one bit in the masked request vector indicates that a requestor is requesting a resource, and
    the signal from the second priority encoder if no bit in the masked request vector indicates that a requestor is requesting a resource.

5. The apparatus of claim 4, further comprising:
    a grant generator to receive the signal from the selector unit and to provide grant signals to the requestors.

6. The apparatus of claim 4, wherein the signal from the selector unit is provided to the masking unit.

7. The apparatus of claim 1, wherein the apparatus is associated with at least one of: (i) a packet network, (ii) a local area network, (iii) an Ethernet network, (iv) a switch, and (v) a router.

8. The apparatus of claim 1, wherein each requestor is associated with a media application control module.

9. The apparatus of claim 1, wherein the selected requestor is associated with an information packet to be processed.

10. The apparatus of claim 1, wherein the apparatus is associated with at least one of: (i) an application specific integrated circuit device, (ii) a field-programmable gate array device, and (iii) a custom integrated circuit.

11. An apparatus, comprising:
    a storage medium having stored thereon instructions that when executed by a machine result in the following:
        determining a request vector, wherein each bit in the request vector represents a requestor and indicates if that requestor is requesting a resource;
        masking a portion of the request vector based on a previously selected requestor;
        selecting via a first priority encoder a requestor in accordance with the masked request vector;
        selecting via a second priority encoder an alternate selected requester in accordance with the un-masked request vector; and
        arranging for a packet to be transmitted via the resource by one of the selected requestor or the alternate selected requester.

12. The apparatus of claim 11, wherein execution of the instructions further result in:
    allocating the resource to the selected requestor.

13. A switch, comprising:
    an Ethernet interface; and
    a resource allocation unit, including:
        a masking unit to receive a request vector and to provide a masked request vector, wherein each bit in the request vector represents a requestor and indicates if that requestor is requesting a resource;
        a first priority encoder to receive the masked request vector from the masking unit and to output a signal indicating a selected requestor; and
        a second Priority encoder to receive the un-masked request vector and to output a signal indicating an alternate selected requestor.

14. The switch of claim 13, wherein each requestor is associated with a media application control module and the resource is associated with information packet processing.

15. A method, comprising:
    determining a request vector, wherein each bit in the request vector represents a requestor and indicates if that requestor is requesting a resource;
    masking a portion of the request vector based on a previously selected requestor;
    selecting via a first priority encoder a requestor in accordance with the masked request vector;
    selecting via a second priority encoder an alternate selected requester in accordance with the un-masked request vector; and
    arranging for a packet to be transmitted via the resource by one of the selected requestor or the alternate selected requester.

16. The method of claim 15, wherein the request vector is an N-bit request vector having bits $[b_{N-1}, \ldots, b_0]$, and said masking comprises:

masking bits $b_L$ through $b_0$ in the request vector, wherein $b_L$ represents the previously selected requestor.

17. The method of claim 16, wherein said masking comprises:

creating an N-bit mask vector having bits $[m_{N-1}, \ldots, m_0]$, wherein bits $m_{N-1}$ through $m_{L+1}$ are set to one and bits $m_L$ through $m_0$ are set to zero; and combining the request vector and the mask vector via a Boolean AND operation.

18. The method of claim 16, wherein said selecting comprises:

selecting the requestor associated with the least significant bit in the masked request vector that indicates the requestor is requesting a resource.

19. The method of claim 18, wherein said selecting is performed via a priority encoder.

20. The method of claim 16, wherein said selecting comprises:

selecting the requestor associated with the most significant bit in the masked request vector that indicates the requestor is requesting a resource.

21. The method of claim 15, further comprising:

allocating the resource to the selected requestor.

* * * * *